(12) United States Patent
Ohta et al.

(10) Patent No.: US 7,496,010 B2
(45) Date of Patent: Feb. 24, 2009

(54) DISK DRIVE AND PRE-PIT DETECTION METHOD

(75) Inventors: Shinji Ohta, Kanagawa (JP); Tatsushi Sano, Kanagawa (JP)

(73) Assignee: Sony Corporation, Tokyo (JP)

( * ) Notice: Subject to any disclaimer, the term of this patent is extended or adjusted under 35 U.S.C. 154(b) by 501 days.

(21) Appl. No.: 10/680,109

(22) Filed: Oct. 8, 2003

(65) Prior Publication Data

US 2004/0071057 A1    Apr. 15, 2004

(30) Foreign Application Priority Data

Oct. 10, 2002    (JP)    ............................. 2002-297102

(51) Int. Cl.
    *G11B 7/00*    (2006.01)
(52) U.S. Cl. .............. 369/47.27; 369/47.22; 369/59.17; 369/124.11; 369/53.34; 369/47.28
(58) Field of Classification Search .............. 369/47.22, 369/53.34, 59.17, 124.05, 124.07, 124.11, 369/124.12, 124.15, 47.27, 47.28, 47.25, 369/47.29, 47.36, 59.15, 59.21
See application file for complete search history.

(56) References Cited

U.S. PATENT DOCUMENTS

| | | | | |
|---|---|---|---|---|
| 5,859,820 A | * | 1/1999 | Nagasawa et al. | 369/47.35 |
| 5,928,041 A | * | 7/1999 | Anderson et al. | 440/61 R |
| 5,943,313 A | * | 8/1999 | Ando et al. | 369/275.4 |
| 6,188,654 B1 | * | 2/2001 | Kaku et al. | 369/47.27 |
| 6,337,838 B1 | * | 1/2002 | Hikima et al. | 369/53.31 |
| 6,487,149 B1 | * | 11/2002 | Yokoi et al. | 369/47.25 |
| 6,603,726 B1 | * | 8/2003 | Yoshida et al. | 369/124.01 |
| 6,603,729 B1 | * | 8/2003 | Van Den Enden | 369/275.3 |
| 6,674,700 B2 | * | 1/2004 | Minamino et al. | 369/47.22 |
| 6,785,207 B2 | * | 8/2004 | Nishimura et al. | 369/47.27 |
| 6,801,488 B2 | * | 10/2004 | Kato et al. | 369/47.28 |
| 6,836,458 B2 | * | 12/2004 | Adachi | 369/59.26 |
| 6,891,782 B1 | * | 5/2005 | Saito et al. | 369/44.29 |
| 6,928,041 B2 | * | 8/2005 | Kato et al. | 369/53.24 |
| 7,027,374 B2 | * | 4/2006 | Minamino et al. | 369/53.34 |

(Continued)

FOREIGN PATENT DOCUMENTS

JP    2000-149259    5/2000

(Continued)

*Primary Examiner*—Wayne R Young
*Assistant Examiner*—Thomas D Alunkal
(74) *Attorney, Agent, or Firm*—Oblon, Spivak, McClelland, Maier & Neustadt, P.C.

(57) ABSTRACT

A push-pull signal is detected from light reflected from a disk-shaped storage medium on which wobbling grooves are formed as recording tracks and address information is recorded by forming pre-pits on lands between adjacent grooves. A fundamental amplitude variation signal indicating the fundamental amplitude variation of the push-pull signal is acquired, and a reference voltage is generated by adding an offset voltage to the fundamental amplitude variation signal. Pre-pits are detected by comparing the push-pull signal with the reference voltage. Because the reference voltage is produced on the basis of the fundamental amplitude variation signal indicating the variation components of the push-pull signal due to the wobbling of grooves and noise, the variation components due to the wobbling and noise are reflected in the reference voltage. Furthermore, the variation components of the push-pull signal corresponding to the pre-pits are also reflected to a properly small extent in the reference voltage.

9 Claims, 9 Drawing Sheets

U.S. PATENT DOCUMENTS

2002/0114261 A1* 8/2002 Yanagawa et al. ...... 369/124.12
2002/0196723 A1* 12/2002 Ishibashi et al. ......... 369/59.25
2003/0058764 A1* 3/2003 Ueno ..................... 369/47.27
2003/0072230 A1* 4/2003 Yanagawa et al. ........ 369/47.22

FOREIGN PATENT DOCUMENTS

| JP | 2000-260025 | 9/2000 |
| JP | 2002-133758 | 5/2002 |
| JP | 2002-216363 | 8/2002 |

* cited by examiner

FIG. 7A
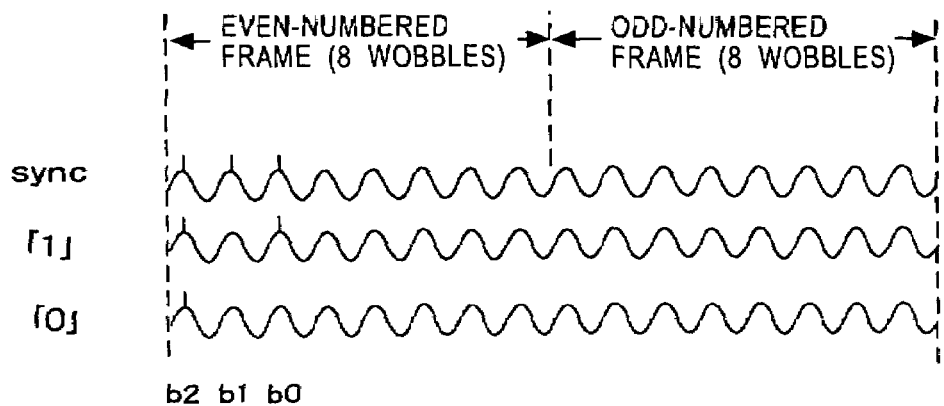
FIG. 7B
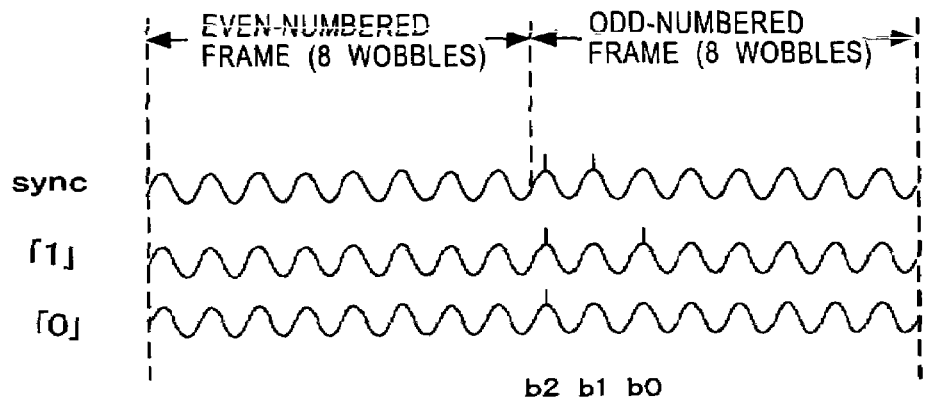
FIG. 7C
|  | b2 | b1 | b0 |
|---|---|---|---|
| sync(even) | 1 | 1 | 1 |
| sync(odd) | 1 | 1 | 0 |
| data「1」 | 1 | 0 | 1 |
| data「0」 | 1 | 0 | 0 |

DISK DRIVE AND PRE-PIT DETECTION METHOD

BACKGROUND OF THE INVENTION

1. Field of the Invention

The present invention relates to a disk drive for writing/reading data on/from a disk-shaped storage medium such as an optical disk and also to a method of detecting pre-pits.

2. Description of the Related Art

In order to write data on a disk, it is required that the disk has guide means for forming data tracks. To meet the above requirement, grooves serving as pre-grooves are formed and resultant grooves or lands (protrusions having the shape of plateau in cross section between adjacent grooves) are used as data tracks.

In order to write data at a desired location on a data track, it is required that an address information be recorded on the disk. The address information is generally recorded by wobbling the grooves or by forming pre-pits on the data tracks.

For example, in the case of DVD-RW that is a rewritable version of DVD (Digital Versatile Disc) based on the phase change recording or DVD-R that is a write-once disk using an organic dye material, wobbling grooves G are formed as pre-format on the disk and land pre-pits LPP are formed on lands L between adjacent grooves G, as shown in FIG. 6.

In this specific case, reflected-light information provided by the wobbling grooves is used to control the rotation of the disk and also used to produce a master clock signal used in writing data. The land pre-pits are used to determine precise write locations of respective bits and also used to acquire various kinds of disk information such as pre-address information. That is, addresses indicating the physical locations on the disk are recorded using land pre-pits LPP.

A disk drive adapted to such a disk reads addresses by detecting land pre-pits formed on the disk and performs various controls in the writing/reading operation on the basis of the detected pre-pit information indicating the location on the disk.

FIG. 7 shows a format of land pre-pits LPP.

Each interval of a track including 8 wobbles forms one frame, and each set of one even-numbered frame and one odd-numbered frame, including a total of 16 wobbles, forms one unit of land pre-pit information.

As shown in FIG. 6, land pre-pits LPP are formed by forming cutouts in the lands in synchronization with wobbles. One bit of address data is expressed by one set of land pre-pits LPP.

FIG. 7A shows an example in which land pre-pit information is formed in even-numbered frames. In this case, first 3 wobbles of each even-numbered frame form one set of land pre-pits LPP.

Let b2, b1, and b0 represent the presence/absence of land pre-pits LPP. If (b2, b1, b0) is (1, 1, 1), that is, when three land pre-pits are formed, a set of those pre-pits LPP serves as a sync signal. A data bit of "1" is expressed by forming two land pre-pits LPP at b2 and b0. That is, when (b2, b1, b0)=(1, 0, 1), the data bit is "1". On the other hand, a data bit of "0" is expressed by forming one pre-pit LPP at b2. That is, when (b2, b1, b0)=(1, 0, 0), the data bit is "0".

FIG. 7B shows an example in which land pre-pit information is formed in odd-numbered frames. In this case, first 3 wobbles of each odd-numbered frame form one set of land pre-pits LPP whose absence/presence are expressed by (b2, b1, b0).

In the case in which land pre-pit information is formed in odd-numbered frames, when (b2, b1, b0)=(1, 1, 0), a set of those land pre-pits represents a sync signal. As in even-numbered frames, a data bit of "1" is represented by (b2, b1, b0)=(1, 0, 1), and a data bit of "0" is represented by (b2, b1, b0)=(1, 0, 0).

In FIG. 7C, sync signals and data bits represented by combinations of b2, b1, and b0 are summarized in the form of a table.

In each 16-wobble interval, land pre-pits LPP are formed only in either an even-numbered frame or an odd-numbered frame. Determination as to in which frame to form land pre-pits LPP is made for each 16-wobble interval such that land pre-pits LPP are not formed on both adjacent groove tracks on a disk.

Information expressed by land pre-pits LPP can be acquired in the form of a push-pull signal by detecting light reflected from a disk. More specifically, the push-pull signal is obtained as a differential signal between signals corresponding to the intensities of light reflected from a left-hand part and a right-hand part of a laser spot scanning on the disk in a track line direction.

FIG. 8 shows a circuit for detecting land pre-pits LPP.

The disk drive has an optical head including a photodetector 51, such as a quadrant photodetector having four photodetector elements A, B, C, and D, for detecting light reflected from a disk.

In this specific case, signals output from the photodetector elements A and C of the photodetector 51 are added together by an adder 56, and signals output from the photodetector elements B and D are added together by an adder 55. The outputs of the adders 55 and 56 are supplied to a push-pull signal generator 52. The push-pull signal generator 52 includes a differential amplifier A1 and resistors R11 to R14.

The push-pull signal generator 52 outputs a push-pull signal P/P proportional to ((A+C)−(B+D)).

In the push-pull signal P/P, as shown in FIGS. 9A and 9B, relatively large amplitudes (SLP1, SLP2, and SLP3) corresponding to land pre-pits LPP are obtained. Thus, information represented by land pre-pits LPP can be detected by detecting the large amplitudes.

To achieve the above, a reference voltage Vth is supplied from a reference voltage source 54 to a comparator 53, and the comparator 53 compares the push-pull signal P/P with the supplied reference voltage Vth. The comparator 53 outputs a two-level signal indicating the comparison result. Thus, a detection signal LPPout corresponding to the land pre-pits LPP is obtained.

High and low levels of this detection signal LPPout correspond to the land pre-pits LPP correspond to "1" and "0", respectively, of b2, b1, and b0 of the land pre-pits LPP.

Furthermore, a decoder (not shown) extracts address information by detecting sync signals and data bits (with a level of "1" or "0") corresponding to b2, b1, and b0.

FIGS. 9A and 9B show land pre-pit detection signals LPPout obtained by comparing the push-pull signal P/P with the threshold voltage Vth.

A known technique of detecting land pre-pits LPP may be found, for example, in U.S. Pat. No. 6,337,838.

However, if information is written on grooves serving as recording tracks, recording marks (phase change bits) formed on the grooves interfere with the land pre-pits LPP. As a result, it becomes difficult to correctly read the land pre-pits LPP. More specifically, the interference of recording marks results in a reduction in reflectance, and thus a reduction occurs in amplitude of the push-pull signal P/P corresponding to the land pre-pits LPP.

The push-pull signal P/P has amplitude variations due to wobbling of tracks, crosstalk from adjacent tracks, and a variation in quality of the disk.

The influence of such variations in amplitude of the push-pull signal P/P on the detection of pre-pits is described below with reference to FIGS. 9A and 9B.

By way of example, let assume that three pulses corresponding to three land pre-pits LPP ((b2, b1, b0)=(1, 1, 1)) indicating a sync signal in an even-numbered frame appear in the push-pull signal P/P.

In the example shown in FIG. 9A in which three pulse components SLP1, SLP2, and SLP3 appear in the push-pull signal P/P, the amplitude of the third pulse component SLP3 is smaller than the amplitudes of the first and second pulse components SLP1 and SLP2.

The reduction in the amplitude SLP3 is caused by presence of a recording mark M adjacent to the land pre-pit LPP, as represented by i in FIG. 6.

As can be seen from the envelope of the waveform of the push-pull signal P/P shown in FIG. 9A, the push-pull signal P/P has a periodic variation in level caused by wobbles. The push-pull signal P/P also includes a variation in level due to crosstalk noise.

As described above with reference to FIG. 8, when the land pre-pit detection signal LPPout is produced by comparing the push-pull signal P/P with the threshold voltage Vth, if the threshold voltage Vth is set to a level as shown in FIG. 9A, the third land pre-pit LPP (pulse SLP3) is not detected.

That is, (b2, b1, b0)=(1, 1, 1) is erroneously detected as (b2, b1, b0)=(1, 1, 0).

If the threshold voltage Vth is reduced, correct detection is possible even for pulse components corresponding to land pre-pits LPP whose amplitude is reduced by the presence of recording marks. However, the reduction in the threshold voltage can cause a component of the push-pull signal P/P, which does not correspond to a pre-pit LPP but whose amplitude is increased by wobbling or noise, to be erroneously detected as a pre-pit in the detection signal LPPout, as is the case with incorrect pulses denoted by N in FIG. 9B.

As described above, the amplitude variation of the push-pull signal P/P due to wobbling and/or recording marks can cause the problem that land pre-pits LPP are not correctly detected.

Incorrect detection of land pre-pits LPP results in an increase in address error rate. That is, it becomes impossible to correctly read address information. This results in degradation in performance of operation of writing/reading data on/from a disk and also degradation in seeking operation.

U.S. Pat. No. 6,337,838 cited above discloses a technique of reducing the variation in amplitude of the push-pull signal P/P by using a so-called AGC circuit. However, U.S. Pat. No. 6,337,838 does not disclose a technique of properly setting a threshold value used in producing the land pre-pit detection signal LPPout.

SUMMARY OF THE INVENTION

In view of the above, it is an object of the present invention to provide a disk drive capable of correctly detecting address information represented by land pre-pits even in a situation in which the amplitude of a push-pull signal varies due to wobbling, noise, and/or interference of recording marks.

In an aspect, the present invention provides a disk drive comprising an optical head for emitting a laser beam so as to illuminate a disk-shaped storage medium thereby writing or reading data on or from the disk-shaped storage medium, grooves serving as recording tracks being formed in a wobbling fashion on the disk-shaped storage medium, pre-pits being formed on lands between adjacent grooves, a push-pull signal generator for generating a push-pull signal from reflected-light information detected by the optical head, an amplitude variation signal generator for generating and outputting a fundamental amplitude variation signal indicating the fundamental amplitude variation of the push-pull signal, an offset signal generator for generating an offset signal, a reference signal generator for generating a reference signal by adding the offset signal generated by the offset signal generator to the fundamental amplitude variation signal generated by the amplitude variation signal generator, and a pre-pit detector for comparing the push-pull signal with a reference signal and outputting a comparison result as a pre-pit detection signal.

In another aspect, the present invention provides a disk drive comprising an optical head for emitting a laser beam so as to illuminate a disk-shaped storage medium and detecting light reflected from the disk-shaped storage medium thereby writing or reading data on or from the disk-shaped storage medium, grooves serving as recording tracks being formed in a wobbling fashion on the disk-shaped storage medium, pre-pits being formed on lands between adjacent grooves, a push-pull signal generator for generating a push-pull signal from reflected-light information detected by the optical head, an amplitude variation signal generator for generating and outputting a fundamental amplitude variation signal indicating the fundamental amplitude variation of the push-pull signal, an offset signal generator for generating an offset signal, a reference signal generator for generating a reference signal by adding the offset signal generated by the offset signal generator to the fundamental amplitude variation signal generated by the amplitude variation signal generator, and a pre-pit detector for comparing the push-pull signal with a reference signal and outputting a comparison result as a pre-pit detection signal.

In another aspect, the present invention provides a method of detecting pre-pits formed on a disk-shaped storage medium, grooves serving as recording tracks being formed in a wobbling fashion on the disk-shaped storage medium, address information being represented by the pre-pits formed on lands between adjacent grooves, the method comprising the steps of generating a push-pull signal from reflected-light information obtained when the disk-shaped storage medium is illuminated with a laser beam, generating and outputting a fundamental amplitude variation signal indicating the fundamental amplitude variation of the push-pull signal, generating a reference signal by adding an offset signal to the fundamental amplitude variation signal, and comparing the push-pull signal with the reference signal and outputting a comparison result as a pre-pit detection signal.

In the present invention, as described above, the fundamental amplitude variation signal indicating the fundamental amplitude variation of the push-pull signal is acquired, and the reference voltage is generated by adding the offset voltage to the fundamental amplitude variation signal. Thus, the reference signal used in comparison to detect pre-pits varies in accordance with the fundamental amplitude variation of the push-pull signal.

Because the fundamental amplitude variation signal is the variation component of the push-pull signal due to the wobbling of grooves and noise, and thus the reference voltage also varies in accordance with the amplitude variation component of the push-pull signal due to the wobbling or noise. Furthermore, the variation components of the push-pull signal corresponding to the pre-pits are also reflected to a properly small extent in the fundamental amplitude variation signal via the limited charging in response to peak detection so that the influence of the variation in amplitude due to the presence of recording marks is minimized.

The response characteristic of the fundamental amplitude variation signal to the amplitude variation of the push-pull signal due to wobbling and to the amplitude variations corresponding to pre-pits is optimized by adjusting the time constants with which the capacitor is charged and discharged.

That is, the fundamental amplitude variation signal is produced using the circuit that serves as the peak hold circuit with the limited rising-up time constant in the charging operation and that also serves as the discharging circuit with the limited falling-down time constant in the discharging operation, and the threshold voltage is obtained by adding the offset voltage to the fundamental amplitude variation signal thereby ensuring that pre-pit information is correctly detected from the input signal (push-pull signal) whose amplitude varies.

BRIEF DESCRIPTION OF THE DRAWINGS

FIG. 7 is a diagram showing a format of a land pre-pit signal;

DESCRIPTION OF THE PREFERRED EMBODIMENTS

The present invention is described in further detail below with reference to preferred embodiments. In those embodiments described below, by way of example, a disk drive (writing/reading device) is assumed to be adapted to an optical disk of the type of DVD-R or DVD-RW.

Figure 1:
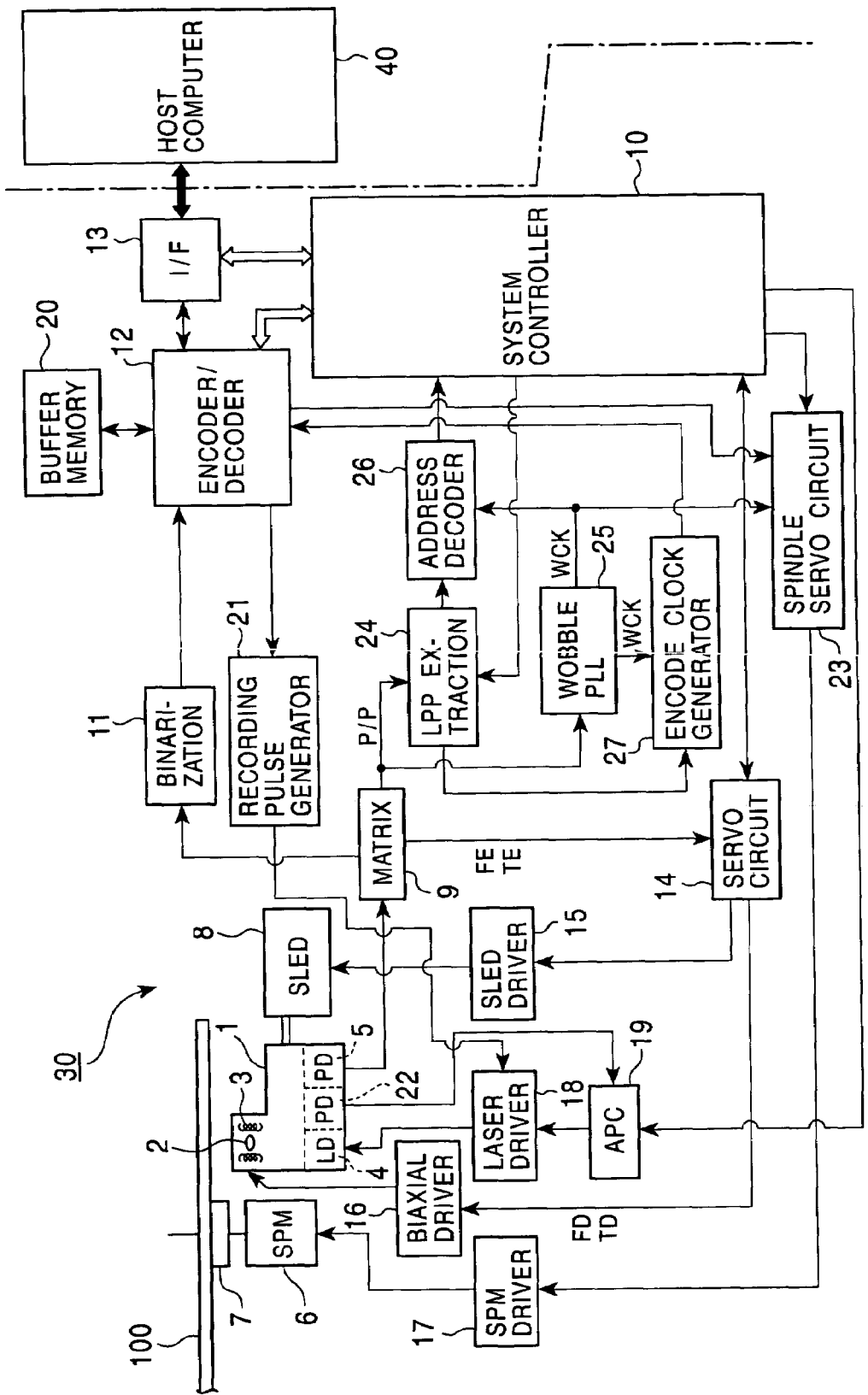
FIG. 1 is a block diagram showing a disk drive according to an embodiment of the present invention.

FIG. 1 shows the construction of a disk drive 30 according to an embodiment of the present invention.

A disk 100 such as a DVD-R or DVD-RW disk is placed on a turn table 7 and is rotated at a constant linear velocity (CLV) by a spindle motor 6 during a writing/reading operation. An optical pickup 1 reads pit mark data recorded on tracks (groove tracks) on the disk 100, wobbling information of tracks, and land pre-pit information. Data pits are formed as dye change pits or phase change pits on tracks in the form of grooves thereby recording data on the disk.

The pickup 1 includes, in the inside thereof, a laser diode 4 serving as a source of laser light, a photodetector 5 for detecting reflected light, an objective lens 2 via which the laser light is emitted to the outside, and an optical system (not shown) for illuminating the recording surface of the disk with the laser light via the objective lens 2 and for guiding reflected light to the photodetector 5.

The pickup 1 also includes a monitor detector 22 to which a part of the light output from the laser diode 4 is supplied.

The laser diode 4 outputs laser light with a wavelength of 650 nm or 635 nm. The optical system has a NA of 0.6.

The objective lens 2 is supported by a biaxial mechanism 3 such that the objective lens 2 is movable in tracking and focusing directions.

The pickup 1 is driven in a radial direction of the disk by a sled mechanism 8.

The laser diode 4 of the pickup 1 is driven by a drive signal (drive current) output from a laser driver 18. The laser diode 4 emits laser light in accordance with the drive signal.

Reflected light information from the disk 100 is detected by the photodetector 5 and converted into an electric signal corresponding to the intensity of the reflected light. The resultant electric signal is supplied to a matrix circuit 9.

The matrix circuit 9 includes a current-voltage converter for converting the current signals output from a plurality of photodetector elements of the photodetector 5 into voltage signals and also includes a matrix operation/amplification circuit for generating necessary signals by means of matrix operation.

The signals generated by the matrix operation/amplification circuit include an RF signal corresponding to data read from the disk, a focus error signal FE and a tracking error signal TE used in servo control.

Furthermore, the matrix operation/amplification circuit also produces a push-pull signal P/P associated with land pre-pits and wobbling of grooves. The push-pull signal P/P is also used as a tracking error signal.

The RF signal output from the matrix circuit 9 is supplied to a binarization circuit 11, and the focus error signal FE and the tracking error signal TE are supplied to a servo circuit 14. The push-pull signal P/P is supplied to the land pre-pit extractor 24 and a wobble PLL 25.

The push-pull signal P/P is converted into a two-level signal by the land pre-pit extractor 24. The resultant signal is supplied as land pre-pit information to an address decoder 26. The address decoder 26 decodes the preformatted address information. The resultant decoded address information is supplied to a system controller 10.

The wobble PLL 25 generates a wobble clock WCK from the push-pull signal P/P by means of PLL operation. The generated wobble clock WCK is supplied to an encode clock generator 25, the address decoder 26, and a spindle servo circuit 23.

The RF signal output from the matrix circuit 9 is converted into a two-level signal by the binarization circuit 11 and is supplied to an encoder/decoder 12.

The encoder/decoder 12 includes a decoder used in the reading operation and an encoder used in the writing operation.

In the reading operation, the encoder/decoder 12 performs a decoding process including decoding of a run-length-limited code, error correction, and deinterleaving, thereby producing reproduced data.

Furthermore, in the reading operation, the encoder/decoder 12 generates a reproduced clock synchronized with the RF signal by means of the PLL operation and performs the above-described decoding process in accordance with the reproduced clock.

In the reading operation, decoded data output from the encoder/decoder 12 is stored in a buffer memory 20.

The data stored in the buffer memory 20 is read out and output to the outside of the disk drive 30.

An interface 13 connected to an external host computer 40 serves to interface with the host computer 40 in transmitting/receiving reproduced data, data to be stored, or various commands.

In the reading operation, the data decoded and stored in the buffer memory 20 is read out and transferred to the host computer 40 via the interface 13.

A read command and a write command output from the host computer 40 are supplied to the system controller 10 via the interface 13.

On the other hand, in the writing operation, data to be written is output from the host computer 40 and is stored in the buffer memory 20 via the interface 13.

In the writing operation, the encoder/decoder 12 encodes the data stored in the buffer memory 20, wherein the encoding includes addition of error correction codes, interleaving, addition of sub-codes, and run-length-limited coding of the data to be written on the disk 100.

The encode clock used as a reference cock in the writing operation is generated by an encode clock generator 27. In synchronization with the encode clock signal, the encoder/decoder 12 performs encoding.

The encode clock generator 27 generates the encode clock on the basis of the wobble clock WCK supplied from the wobble PLL 25 and the land pre-pit information supplied from the land pre-pit extractor 24.

The data to be written, produced via the encoding performed by the encoder/decoder 12, is converted into recording pulses by a recording pulse generator 21 and supplied to the laser driver 18.

The recording pulse generator 21 also makes recording compensation in terms of the characteristic of the recording layer, the shape of the laser spot, the fine adjustment of the optimum writing power depending on the linear velocity of the disk, and adjustment of the waveform of the laser driving pulse.

The laser driver 18 supplies a driving current to a laser diode 4 in accordance with the supplied laser driving pulse thereby driving the laser diode 4 to emit a laser beam. As a result, bits (dye change bits/phase change bits) corresponding to the recording data are formed on the disk 100.

An APC (Auto Power Control) circuit 19 monitors the output power of the laser by using the monitor detector 22 and controls the output power of the laser such that the output power is maintained at a constant value regardless of temperature and other factors. More specifically, a target value of the laser output power is given by the system controller 10, and the APC circuit 19 controls the laser driver 18 such that the laser output power is maintained at the target value.

The servo circuit 14 generates servo drive signals associated with focusing, tracking, and the sled from the focus error signal FE and the tracking error signal TE output from the matrix circuit 9, whereby the servo circuit 14 servo-controls the focusing, tracking, and the operation of the sled.

More specifically, the servo circuit 14 generates a focus drive signal FD and a tracking drive signal TD on the basis of the focus error signal FE and the tracking error signal TE and the supplies the generated focus drive signal FD and tracking drive signal TD to a biaxial driver 16. In accordance with the supplied focus drive signal FD and tracking drive signal TD, the biaxial driver 16 drives a focus coil and a tracking coil of the biaxial mechanism 3 of the pickup 1. Thus, a tracking servo loop and a focus serve loop are formed by the pickup 1, the matrix circuit 9, the servo processor 14, and the biaxial driver 16, and the biaxial mechanism 3.

If the servo circuit 14 receives a track jump command from the system controller 10, the servo circuit 14 turns off the tracking servo loop and outputs a jump drive signal to the biaxial driver 16 thereby making the biaxial driver 16 perform a track jump operation.

Furthermore, the servo circuit 14 generates a sled drive signal in accordance with a sled error signal obtained as a low-frequency component of the tracking error signal TE and in accordance with an access command supplied from the system controller 10. The generated sled drive signal is supplied to a sled driver 15. In accordance with the supplied sled drive signal, the sled driver 15 drives the sled mechanism 8. Although not shown in the figure, the sled mechanism 8 includes a main shaft for holding the pickup 1, a sled motor, and a transmission gear, whereby the sled mechanism 8 slides the pickup 1 in cooperation with the sled motor 8 driven by the sled drive signal output from the sled driver 15.

A spindle serve circuit 23 controls the spindle motor 6 so as to rotate at a constant linear velocity.

In the writing operation, the spindle servo circuit 23 detects rotation speed information indicating the current rotation speed of the spindle motor 6 from the wobble clock WCK generated by the wobble PLL and spindle servo circuit 23 generates the spindle error signal SPE by comparing the reproduced clock with the predetermined CLV reference information.

In the reading operation, the rotation speed information indicating the current rotation speed of the spindle motor 6 is given by the reproduced clock (used as the reference clock in decoding) generated by the PLL in the encoder/decoder 21, and spindle servo circuit 23 generates the spindle error signal SPE by comparing the reproduced clock with the predetermined CLV reference information.

The spindle servo circuit 23 generates the spindle drive signal in accordance with the spindle error signal SPE and supplies the generated spindle drive signal to the spindle motor driver 17. The spindle motor driver 17 generates a 3-phase drive signal in accordance with the supplied spindle drive signal and supplies the generated 3-phase drive signal to the spindle motor 6 thereby driving the spindle motor 6 at the constant linear velocity (CLV).

Furthermore, the spindle servo circuit 23 generates a spindle drive signal in accordance with a spindle kick/brake control signal supplied from the system controller 10. In accordance with the spindle drive signal supplied from the spindle servo circuit 23, the spindle motor driver 17 starts, stops, accelerates, and decelerates the spindle motor 6.

The above-described operations of the servo system and the writing/reading system are controlled by the system controller 10 formed of a microcomputer.

The system controller 10 performs various processes in accordance with commands issued by the host computer 40.

For example, if the host computer 40 issues a read command to read data recorded on the disk 100, in response to the command, first, the system controller 10 controls the seeking operation to seek a specified address. More specifically, the system controller 10 issues a command to the servo circuit 14 to move the pickup 1 to the address specified by the seek command.

Thereafter, system controller 10 controls necessary parts to read data from specified sectors and transfer the read data to the host computer 40. More specifically, requested data is read from the disk 100, decoded, buffered, and transferred to the host computer 40.

If a write command is issued by the host computer 40, the system controller 10 moves the pickup 1 to a location corresponding to a specified address at which data is to be written. The encoder/decoder 12 encodes the data supplied from the host computer 40.

The recording pulse generator 21 supplies laser driving pulse to the laser driver 18. Thus, the data is written on the disk.

The writing/reading operation of the disk drive 30 is summarized below.

Reading Operation

Servo Operation

The signal detected by the pickup 1 is converted by the matrix circuit 9 into servo error signals such as the focus error signal FE and the tracking error signal TE. The resultant servo error signals are supplied to the servo circuit 14. The biaxial mechanism 3 of the pick up 1 is driven by the driving signal FD and TD output from the servo circuit 14, and thus the focusing and the tracking are servo-controlled.

Reading of Data

The signal detected by the pickup 1 is converted by the matrix circuit 9 into the RF signal and supplied to the encoder/decoder 12. The encoder/decoder 12 reproduces a channel clock and decodes the RF signal on the basis of the channel clock. The decoded data is supplied to the interface 13.

Controlling of Rotation

The rotation of the disk 100 is controlled by the spindle servo circuit 23 on the basis of the channel clock supplied from the encoder/decoder 12.

Detection of Address

Addresses are included in the RF signal and are extracted by the encoder/decoder 12. The extracted addresses are supplied to the system controller 10.

However, in the seeking operation, addresses are extracted from the land pre-pits and seeking to a target location is performed in accordance with the extracted addresses.

Controlling of Laser

The APC circuit 19 controls the laser output power at the constant value specified by the system controller 10.

Writing Operation

Servo Operation

The servo operation is performed in a similar manner to the reading operation except that a correction is made by the matrix circuit 9 or the servo circuit 14 so that the high output power of the laser does not result in an increase in gain.

Writing of Data

Data to be written is acquired via the interface 13. The encoder/decoder 12 performs channel coding including ECC addition, rearrangement, and modulation, on the data. After the channel coding, the data is converted by the recording pulse generator 21 into laser driving pulses in the form suitable for writing the data on the disk 100. The laser driving pulses are supplied to the laser diode 4 of the pickup 1 via the laser driver 18 (APC circuit 19).

Control of Rotation

The push-pull signal P/P output from the matrix circuit 9 the wobble PLL generates the wobble clock WCK. In accordance with the wobble clock WCK, the spindle servo circuit 23 controls the rotation at the constant linear velocity (CLV).

Detection of Addresses

The push-pull signal P/P output from the matrix circuit 9 is supplied to the land pre-pit extractor 24, and land pre-pit information is detected. The detected land pre-pit information is decoded by the address decoder 26 into an address value and interpreted by the system controller 10.

The land pre-pit information is also supplied to the encode clock generator 27. From the land pre-pit information, the encode clock generator 27 generates the encode clock and supplies it to the encoder/decoder 12.

Although in the example shown in FIG. 1, the disk drive 30 is connected to the host computer 40, the disk drive 30 according to the present invention is not necessarily needed to be connected to the host computer 40 or the like. When the disk drive 30 is not connected to the host computer 40 or a similar device, the disk drive 30 may include an operation control unit and a display, and the configuration associated with the data input/output interface may be modified so that input data is written or read data is output in accordance with a command issued by an user via the operation control unit.

In the disk drive 30 described above, a specific circuit configuration for detecting land pre-pits formed on a disk and the operation of the circuit are described below with reference to FIGS. 2, 3, and 4.

Figure 2:
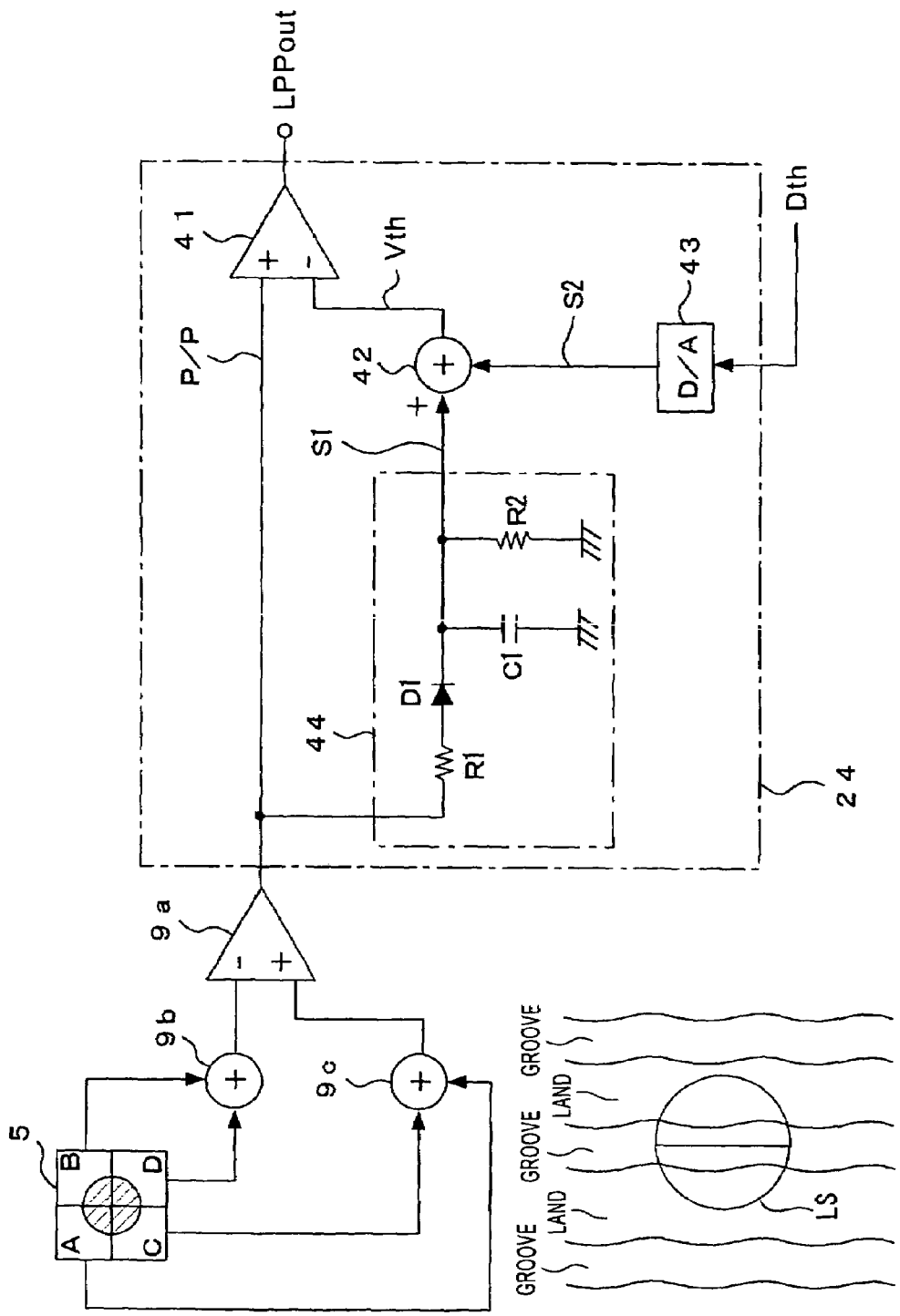
FIG. 2 is a block diagram showing a circuit configuration for detecting land pre-pits, in a disk drive according to an embodiment of the present invention.

Of various parts of the disk drive 30, a part serving to detect land pre-pits is shown in FIG. 2. The part includes the photodetector 5 of the pickup 1, the adders 9b and 9c and the differential amplifier 9a of the matrix circuit 9, and the land pre-pit extractor 24.

Although not shown in FIG. 2, the matrix circuit 9 includes not only the differential amplifier 9a and the adders 9b and 9c for generating the push-pull signal P/P but also a circuit part for generating the RF signal, the focus error signal FE, and the tracking error signal TE.

As shown in FIG. 2, the photodetector 5 is of the quadrant type including four photodetector elements A, B, C, and D. Light reflected from a disk is detected by respective photodetector elements A, B, C, and D, and converted into current signals corresponding to the intensity of light. The current signals output from the photodetector elements A, B, C, and D are converted into voltage signals by the matrix circuit 9. From those voltage signals, the focus error signal FE, and the push-pull signal P/P, and other signals are produced. The process of producing the push-pull signal P/P is described below.

The push-pull signal P/P is produced from an optical signal reflected from a left-hand half of a laser spot LS scanning on a track in a track line direction and an optical signal reflected from a right-hand half of the laser spot LS. The difference between the signal A+C output from the adder 9c and the signal B+D output from the adder 9b is calculated by the differential amplifier 9a, and thus the push-pull signal P/P is obtained, wherein the signal A+C is the sum of voltage signals obtained from the current signals output from the photodetector elements A and C, respectively, and the signal B+D is the sum of voltage signals obtained from the current signals output from the photodetector elements B and D, respectively.

As described earlier with reference to FIG. 1, the push-pull signal P/P is supplied to the wobble PLL 25 to generate the wobble clock WCK synchronized with wobbling of grooves.

The push-pull signal P/P is also supplied to the land pre-pit extractor 24.

The land pre-pit extractor 24 includes a comparator 41, an adder 42, a digital-to-analog converter 43, and a fundamental amplitude variation signal generator 44.

In the land pre-pit extractor 24, the push-pull signal P/P is applied to the comparator 41 and the fundamental amplitude variation signal generator 44.

The fundamental amplitude variation signal generator 44 includes a resistor R1, a diode D1, a capacitor C1, and a resistor R2. The resistor R1 determines the rising-up characteristic, and the resistor R2 determines the falling-down characteristic. This circuit operates like a peak hold circuit.

The fundamental amplitude variation signal generator 44 includes a charging circuit path (including R1, D1, and C1) through which the capacitor C1 is charged by the rising-up input push-pull signal such that the charged voltage of the capacitor C1 rises up to the peak voltage of the push-pull signal with a particular time constant, and fundamental amplitude variation signal generator 44 also includes a discharging circuit path (including C1 and R2) through which the capacitor C1 is discharged such that the charged voltage of the capacitor C1 falls down with a particular time constant.

That is, when the capacitor C1 is charged up to the peak voltage of the push-pull signal P/P, the charging current is limited by the resistor R1.

On the other hand, when the capacitor C1 is discharged, the discharging current is limited by the resistor R2.

Thus, the fundamental amplitude variation signal generator 44 serves as a peak hold circuit in which the resistance of the resistance R1 that determines the rising-up characteristic is properly selected such that the fundamental amplitude variation signal generator 44 does not response to quick changes in the rising-up input signal due to noise, and the resistance of the resistance R2 that determines the falling-down characteristic is properly selected such that the fundamental amplitude variation signal generator 44 does not response to quick changes in the falling-down input signal due to noise. That is, the fundamental amplitude variation signal generator 44 operates like a peak hold circuit having a slow response speed.

The charged voltage of the capacitor C1 is output as a fundamental amplitude variation signal S1.

An offset data Dth is supplied to the digital-to-analog converter 43 from the system controller 10 shown in FIG. 1. The digital-to-analog converter 43 converts the offset data Dth into an analog voltage and outputs the resultant analog voltage as an offset voltage S2.

The adder 42 adds the offset voltage S2 output from the digital-to-analog converter 43 to the fundamental amplitude variation signal S1 output from the fundamental amplitude variation signal generator 44. The result of the addition operation is supplied as a reference voltage Vth to the comparator 41.

The comparator 41 compares the push-pull signal P/P with the reference voltage Vth. If the push-pull signal P/P is greater than the reference voltage Vth, the comparator 41 outputs "1". That is, the result of comparison made by the comparator 41 is output as a pre-pit detection signal LPPout whose level becomes "1" when the push-pull signal P/P is greater than the reference voltage Vth.

The resultant land pre-pit detection signal LPPout is supplied to the address decoder 26 shown in FIG. 1. The address decoder 26 decodes the supplied land pre-pit detection signal LPPout to obtain address information.

Figure 3:
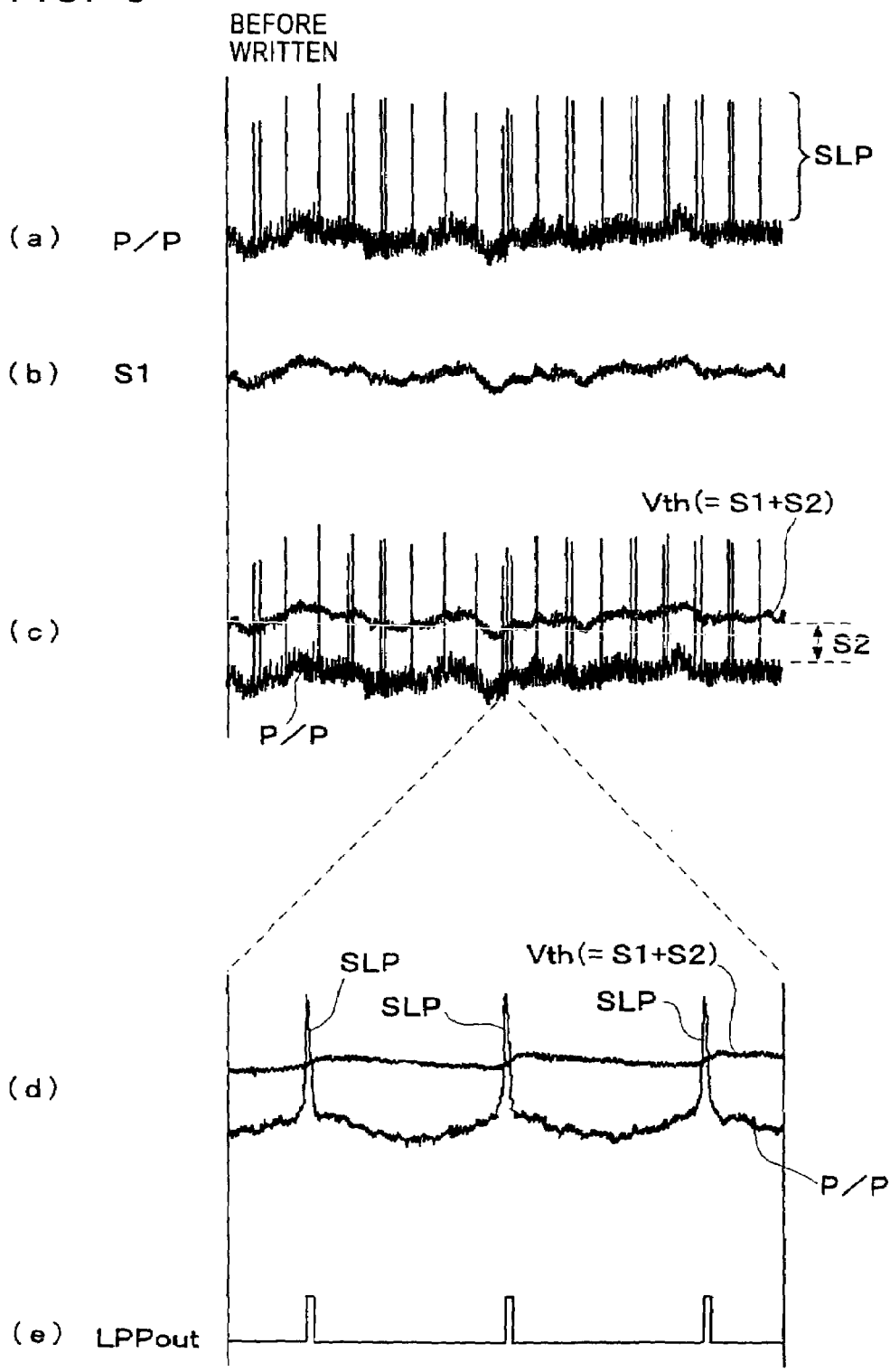
FIG. 3 is a diagram showing waveforms of signals associated with the operation of detecting land pre-pits according to an embodiment of the present invention, for a case in which there is no influence of recording marks.
Figure 4:
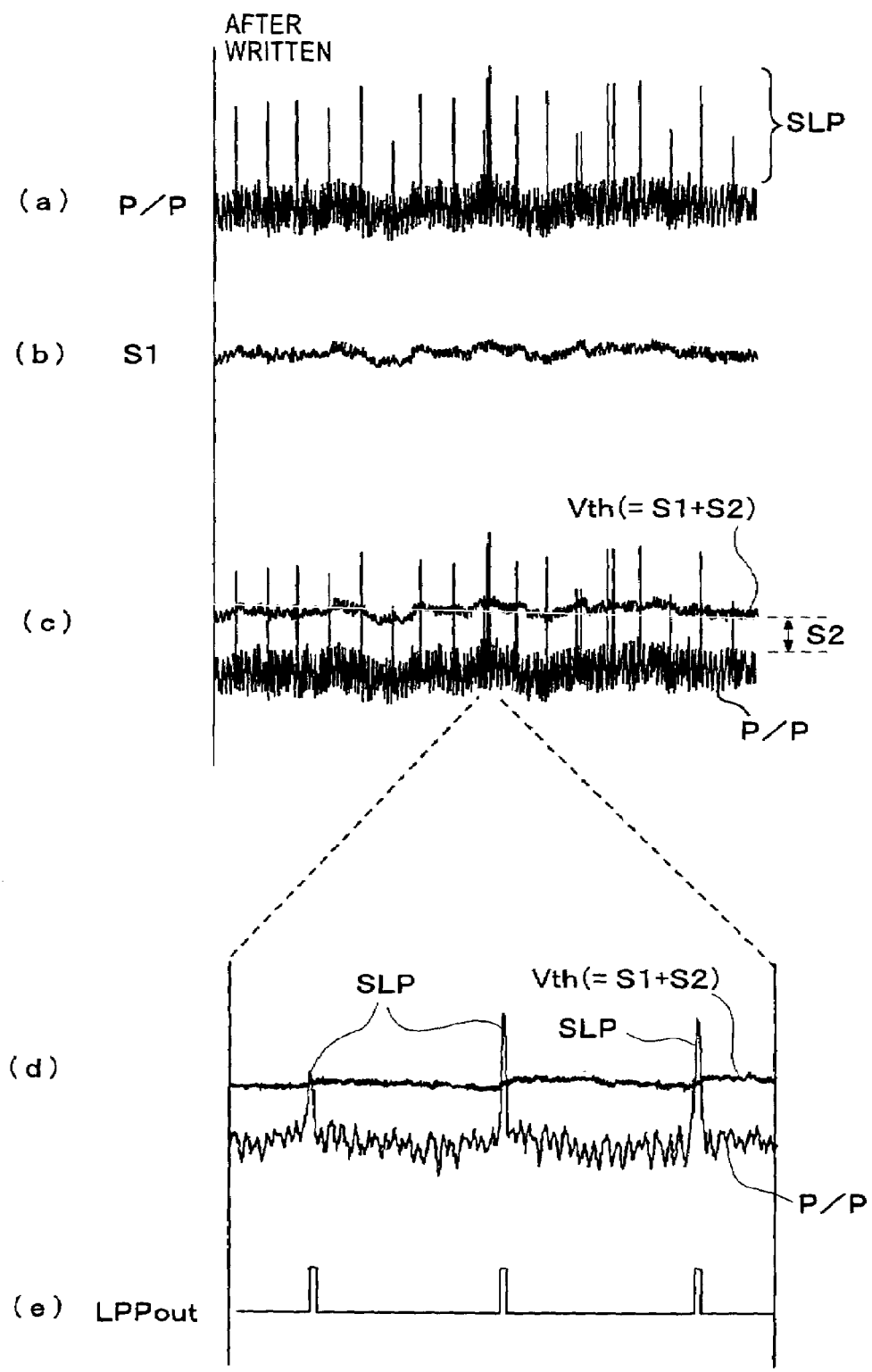
FIG. 4 is a diagram showing waveforms of signals associated with the operation of detecting land pre-pits according to an embodiment of the present invention, for a case in which there is influence of recording marks.

With reference to FIGS. 3 and 4, the operation of the land pre-pit extractor 24 constructed in the above-described manner is described below.

In FIG. 3, (a) shows a push-pull signal P/P detected from an area (non-recorded area) in which no recording marks are formed on a disk, and (b) shows a fundamental amplitude variation signal S1 produced from that push-pull signal P/P.

Furthermore, in FIG. 3, (c) shows a threshold voltage Vth obtained as a result of the addition of the fundamental amplitude variation signal S1 and the offset voltage S2, wherein the push-pull signal P/P is also shown in a superimposed fashion.

In FIG. 3, (d) shows, in an enlarged fashion, a part of the threshold voltage Vth and the push-pull signal P/P shown in (c).

In FIG. 3, (e) shows a land pre-pit detection signal LPPout that is produced from the push-pull signal P/P shown in (d) through the comparison performed by the comparator 41.

In FIG. 4, (a) to (e) show the waveform of the push-pull signal P/P detected in an area (recorded area) in which recording marks are recorded on the disk and the waveforms of other signal corresponding to those shown in FIG. 3.

As can be seen from FIG. 3(a), the push-pull signal P/P includes pulse components SLP corresponding to land pre-pits LPP, and the fundamental component of the push-pull signal P/P obtained by removing the pulse components SLP corresponding to the land pre-pits LPP has a variation in amplitude due to wobbling.

From the push-pull signal P/P, the fundamental amplitude variation signal generator 44 produces the fundamental amplitude variation signal S1 which is the fundamental amplitude-variation component, due to the wobbling of grooves, of the push-pull signal P/P and in which pulse components SLP corresponding to the land pre-pits LPP are reflected to a properly small extent, as shown in FIG. 3(b).

Because the reference voltage Vth shown in FIG. 3(c) is obtained by adding the fixed offset voltage S2 to the fundamental amplitude variation signal S1, the reference voltage Vth has an amplitude variation exactly equal to the amplitude variation of the fundamental amplitude variation signal S1.

As can be clearly seen from FIG. 3(c), the variation in amplitude of the fundamental amplitude variation signal S1 is basically equal to the variation in amplitude of the push-pull signal P/P.

If the variations are viewed in an enlarged fashion, as shown in FIG. 3(d), the level of the fundamental amplitude variation signal S1 increases as a result of the limited charging performed in response to the appearance of a pulse component in the push-pull signal P/P corresponding to a land pre-pit LPP, and the level of the fundamental amplitude variation signal S1 decreases in the other periods due to limited discharging. That is, the pulse components, corresponding to the land pre-pits, of the push-pull signal are reflected to a properly small extent in the variation in amplitude of the fundamental amplitude variation signal S1.

By comparing the push-pull signal P/P with the reference voltage Vth obtained by adding the offset voltage S2 to the fundamental amplitude variation signal S1 whose amplitude varies in the above-described manner, land pre-pit detection signal LPPout can be correctly extracted from the push-pull signal P/P.

That is, as can be seen from FIG. 3(c), because the amplitude of the reference voltage Vth varies in a very similar manner to the variation in amplitude of the push-pull signal P/P caused by wobbling, the resultant land pre-pit detection signal LPPout has high accuracy as shown in FIG. 3(e).

On the other hand, in the case of the push-pull signal P/P detected from a recorded area, as shown in FIG. 4, the amplitudes of the pulse components SLP corresponding to the land pre-pits LPP can be reduced by the presence of recording marks. However, because the reference voltage Vth varies in accordance with the variation in amplitude of the push-pull signal P/P, the land pre-pit detection signal LPPout has high accuracy also in this case. As can be seen from FIG. 4(d), the amplitude of the reference voltage Vth (whose variation is equal to the variation in amplitude of the fundamental amplitude variation signal S1) increases by a small amount in response to a pulse component SLP with a reduced amplitude due to interference with a recording mark compared with variations corresponding to pulse components SLP with non-reduced amplitudes.

That is, as can be seen from FIG. 4(c), the reduction in the amplitude of pulse components corresponding to the land pre-pits due to the recording marks is reflected to a properly small extent in the variation in the reference voltage, and thus a correct land pre-pit detection signal LPPout can be obtained as shown in FIG. 4(e), regardless of whether the pulse components corresponding to the land pre-pits are influenced by the recording marks.

Thus, in the present embodiment, high-accuracy land pre-pit information can be obtained, regardless of whether the amplitude of the push-pull signal P/P varies due to wobbling of tracks, crosstalk from adjacent tracks, and/or a reduction in reflectance of land pre-pits LPP caused by recording marks.

This allows a reduction dead time before correct land pre-pit information starts to be output, and an improvement in address error rate can be achieved. Furthermore, highly reliable writing/reading is possible even for storage media having large variations in characteristics.

The variation in amplitude of the push-pull signal P/P can also occur due to a variation in characteristics of the pickup (optical head 3). The present embodiment also allows land pre-pit information to be correctly detected even when the push-pull signal P/P has such a variation in amplitude. This allows an improvement in production yield of the pickup.

The land pre-pit extractor 24 shown in FIG. 2 can be modified in various manners.

For example, the circuit configuration of the fundamental amplitude variation signal generator 44 is not limited to that shown in FIG. 2, but any other circuit configuration having a similar peak hold characteristic to that described above may also be used. For example, the fundamental amplitude variation signal generator 44 may also be realized using an operational amplifier.

In the present embodiment, the offset voltage S2 is obtained by converting the offset data Dth supplied from the system controller 10 into an analog voltage. Alternatively, the offset voltage S2 may be supplied to the adder 42 directly from a circuit formed of, for example, a voltage source and a fixed resistor for a variable resistor.

As for the adder 42, an arbitrary circuit configuration can be used, as long as the circuit can add the offset voltage S2 to the fundamental amplitude variation signal S1. For example, the respective signals may be converted into digital signals (or digital signals are input) and the addition may be performed digitally.

The comparator 41 is not limited to an analog comparator. Comparison may be performed digitally.

At the input stage of the land pre-pit extractor 24, the push-pull signal P/P may be converted into a digital signal, and the resultant digital signal may be processed digitally by the comparator 41, the adder 42, the fundamental amplitude variation signal generator 44, and the offset voltage generator, which are all formed in digital configurations.

Although in the present embodiment, the peak hold circuit is employed, a bottom hold circuit may be used depending on the polarity of the push-pull signal P/P.

Figure 5:
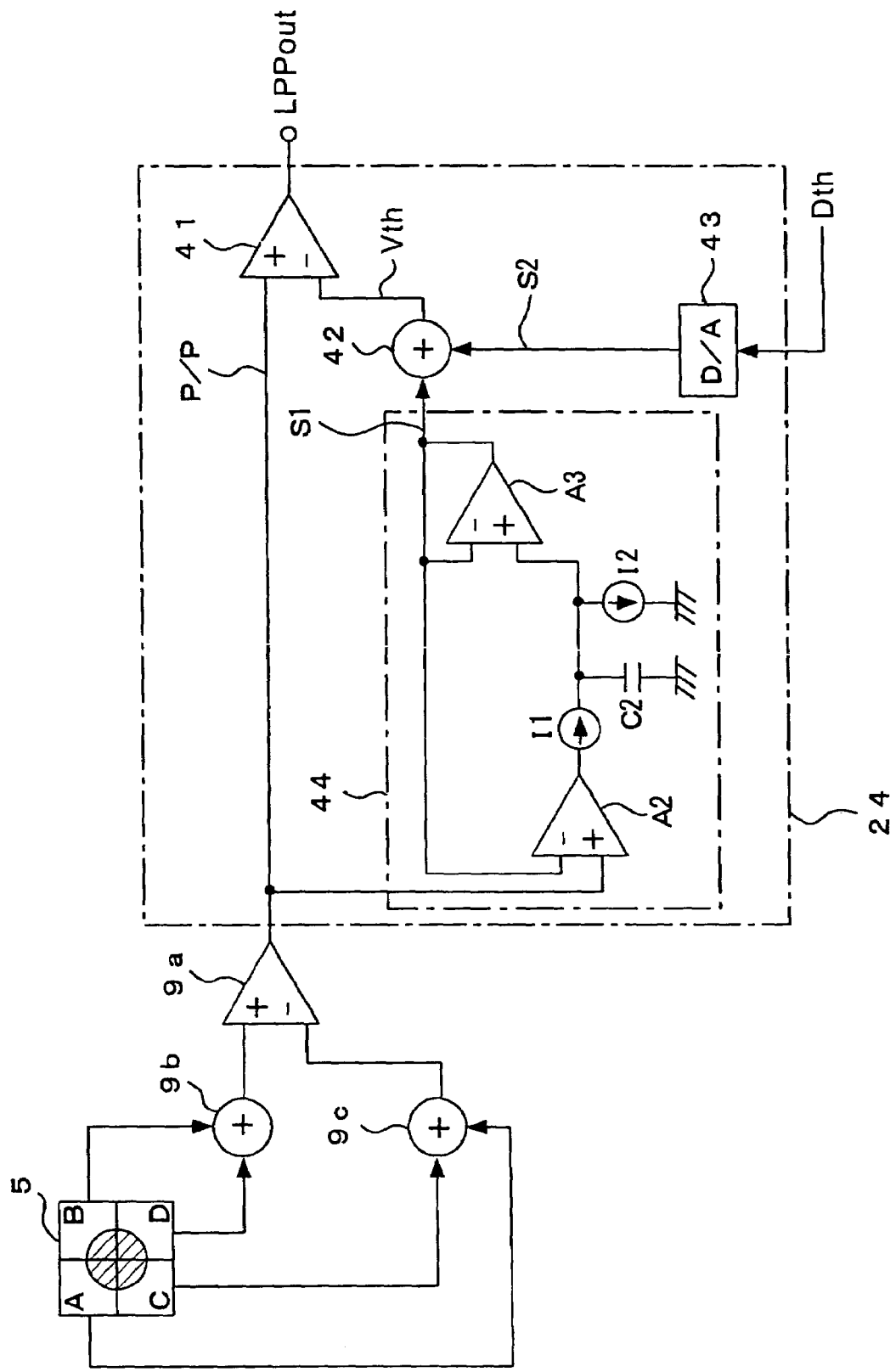
FIG. 5 is a block diagram showing a circuit configuration for detecting land pre-pits, in a disk drive, according to another embodiment of the present invention.
Figure 6:
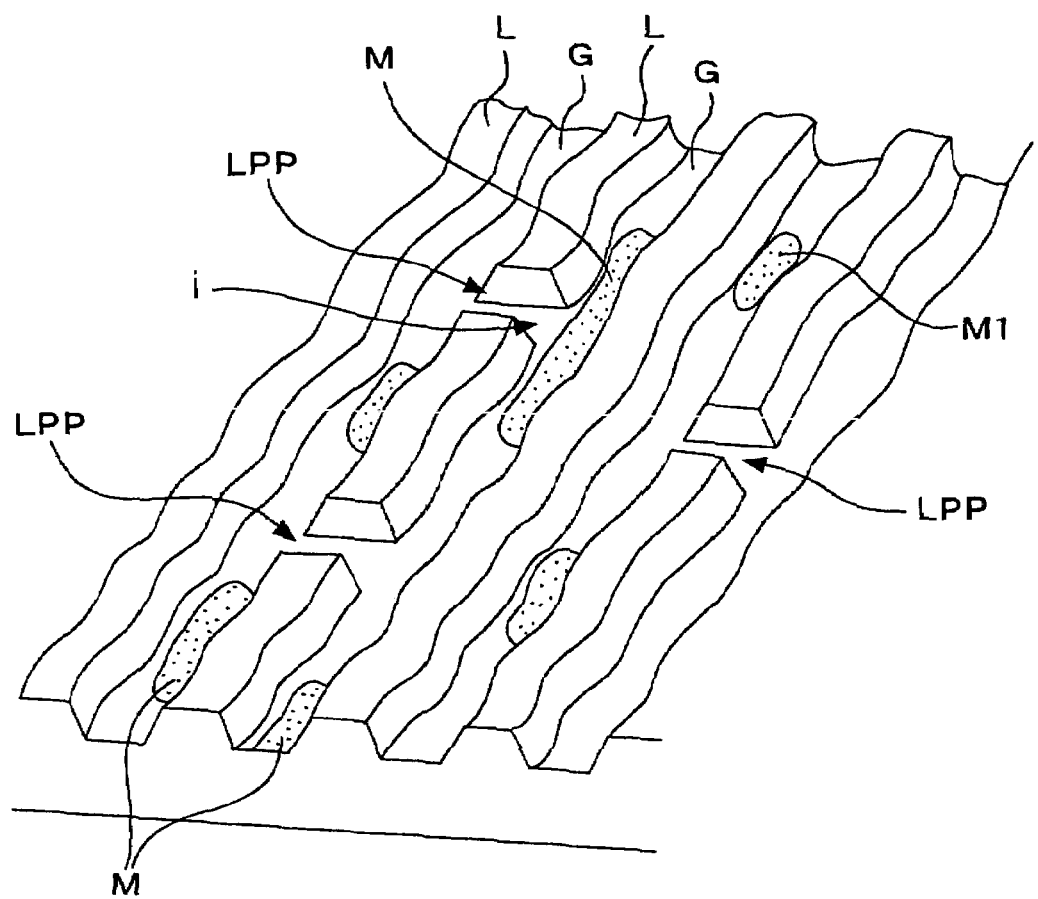
FIG. 6 is a diagram showing a disk having land pre-pits formed thereon.
Figure 8:
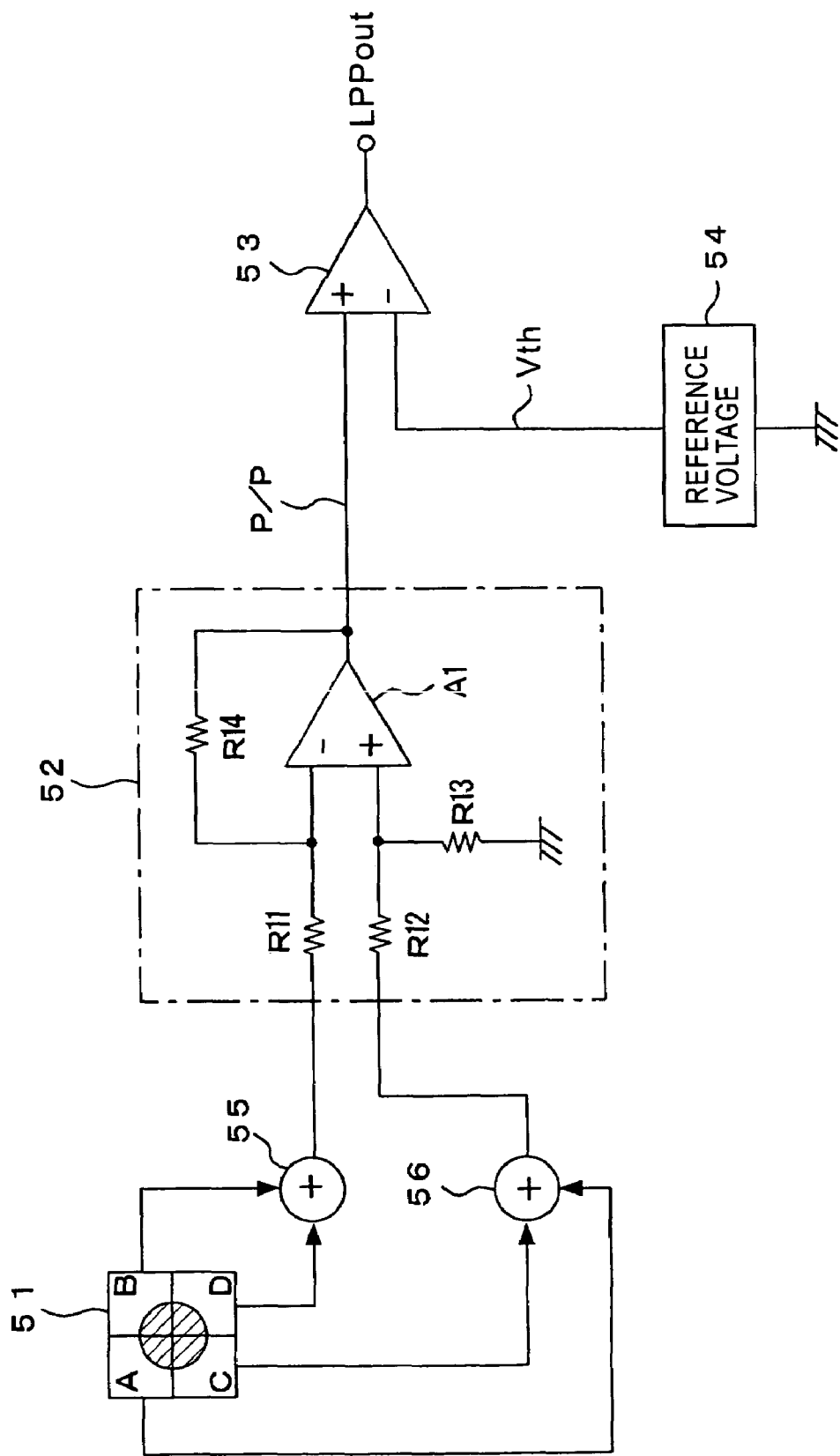
FIG. 8 is a block diagram showing a circuit for detecting land pre-pits according to a conventional technique.
Figure 9A:
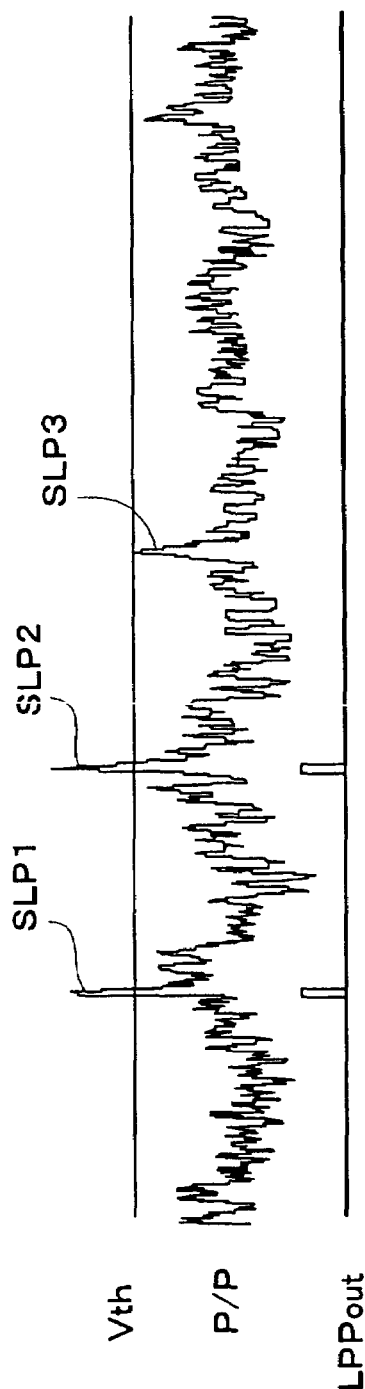
FIG. 9 is a diagram showing waveforms of signals associated with an operation of detecting land pre-pits according to the conventional technique.
Figure 9B:
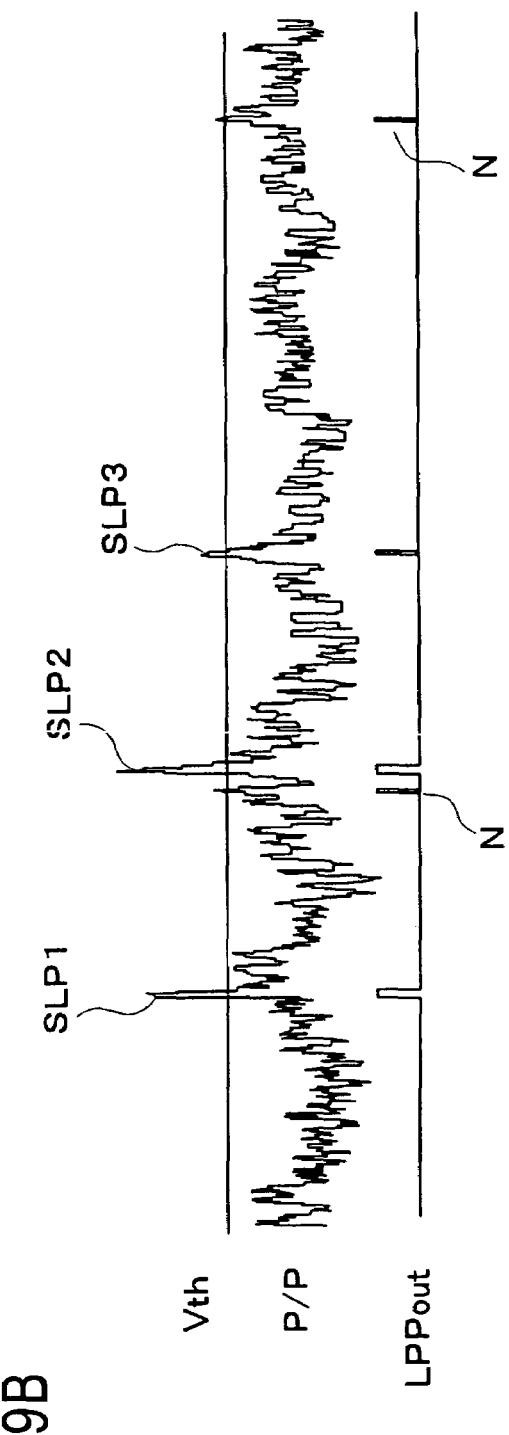

FIG. 5 shows another example of the configuration of the fundamental amplitude variation signal generator 44 in the land pre-pit extractor 24. Except for the fundamental amplitude variation signal generator 44, the configuration is similar to that shown in FIG. 2.

In this circuit configuration, the fundamental amplitude variation signal generator 44 includes an operational amplifier serving as a comparator A2, an operational amplifier serving as a buffer amplifier A3, a capacitor C2, and current sources I1 and I2.

When the input signal is "1", a predetermined current is supplied to the capacitor C2 from the current source I1.

When the level of the input push-pull signal P/P is higher than the level of the output signal of the buffer amplifier A3 (fundamental amplitude variation signal S1), the comparator A2 outputs "1".

The current source I2 causes the capacitor C2 to be always discharged.

The voltage across the capacitor C2 is output as the fundamental amplitude variation signal S1 from the buffer amplifier A3.

The input push-pull signal P/P is compared with the output of the buffer amplifier A3 (fundamental amplitude variation signal S1) by the comparator A2. If the input push-pull signal P/P is higher, the comparator A2 outputs "1", and thus the capacitor C2 is charged up by the current source I1.

The discharge current provided by the current source I2 is selected such that the time constant of discharging of the capacitor C2 becomes nearly equal to a value corresponding to the wobble frequency so that noise in the push-pull signal P/P does not appear in the output signal (fundamental amplitude variation signal S1) and thus the output signal varies smoothly.

Thus, the resultant fundamental amplitude variation signal S1 varies in the manner described above with reference to FIGS. 3 and 4.

In this circuit configuration, if the ratio of the current I1 to I2 is set to 20:1 or a similar ratio, the reference voltage Vth obtained by adding the offset voltage S2 to the fundamental amplitude variation signal S1 works very well in detecting land pre-pit information.

The disk drive and the process of detecting pre-pits according to the present invention have been described above with reference to specific embodiments. Note that the present invention is not limited to those specific embodiments, but various modifications are possible without departing from the spirit and the scope of the present invention.

In the present invention, as can be understood from the above description, the fundamental amplitude variation signal indicating the fundamental amplitude variation of the push-pull signal is acquired, and the reference voltage is generated by adding the offset voltage to the fundamental amplitude variation signal. As a result, the reference voltage used in detecting the pre-pits from the push-pull signal varies in accordance with the variation in the fundamental amplitude variation of the push-pull signal.

This allows high-accuracy detection of land pre-pits by comparison between the push-pull signal and the reference voltage regardless of the variation in the push-pull signal due to wobbling, crosstalk from adjacent tracks, and/or the presence of recording marks.

This allows a reduction dead time before correct land pre-pit information starts to be output, and an improvement in address error rate can be achieved. Furthermore, highly reliable writing/reading is possible even for storage media having a large variation in amplitude.

Furthermore, detection errors of land pre-pits due to a variation in characteristic of the pickup also decrease. This contributes to an improvement in production yield of the pickup.

Because the reference voltage is produced on the basis of the fundamental amplitude variation signal indicating the variation components of the push-pull signal due to the wobbling of grooves and noise, the reference voltage also varies in accordance with the variation in amplitude of the push-pull signal due to the wobbling or noise. Furthermore, the variation components of the push-pull signal corresponding to the pre-pits are also reflected to a properly small extent in the reference voltage so that the influence of the variation in amplitude due to the presence of recording marks is minimized. That is, the reference voltage is properly varied in accordance with variation in amplitude of the push-pull signal.

What is claimed is:

1. A disk drive comprising:
   an optical head configured to emit a laser beam so as to illuminate a disk-shaped storage medium thereby writing or reading data on or from the disk-shaped storage medium, grooves serving as recording tracks being formed in a wobbling fashion on the disk-shaped storage medium, pre-pits being formed on lands between adjacent grooves, and the disk-shaped storage medium representing, using the pre-pits, address information indicating an address on the disk-shaped storage medium;
   a push-pull signal generator configured to generate a push-pull signal from reflected-light information detected by the optical head;
   an amplitude variation signal generator directly connected to the push-pull signal generator and configured to generate and output a fundamental amplitude variation signal indicating the fundamental amplitude variation of the push-pull signal, wherein the amplitude variation signal generator includes:
   a charging circuit for charging a capacitor in response to an increase in amplitude of the input push-pull signal, in a peak holding manner with a predetermined limited rising-up time constant, and
   a discharging circuit for discharging the capacitor such that the changed voltage of the capacitor falls down with a predetermined limited falling-down time constant whereby a signal corresponding to the charged level of the capacitor is output as the fundamental amplitude variation signal;
   an offset signal generator configured to generate an offset signal;
   a reference signal generator connected to the amplitude variation signal generator and to the offset signal generator and configured to generate a reference signal by adding the offset signal received from the offset signal generator to the fundamental amplitude variation signal received from the amplitude variation signal generator;
   a pre-pit detector directly connected to the push-pull signal generator and to the reference signal generator and configured to compare the push-pull signal with the reference signal and outputting a comparison result as a pre-pit detection signal; and
   an address decoder for acquiring address information represented by the pre-pits, from the output of the pre-pit detector.

2. A disk drive according to claim 1, wherein the fundamental amplitude variation signal is a signal reflecting at least the amplitude variation of the push-pull signal due to wobbling of grooves and due to noise.

3. A disk drive comprising:
   an optical head configured to emit a laser beam so as to illuminate a disk-shaped storage medium and detecting light reflected from the disk-shaped storage medium thereby writing or reading data on or from the disk-shaped storage medium, grooves serving as recording tracks being formed in a wobbling fashion on the disk-shaped storage medium, pre-pits being formed on lands between adjacent grooves, and the disk-shaped storage medium representing, using the pre-pits, address information indicating an address on the disk-shaped storage medium;
   a push-pull signal generator configured to generate a push-pull signal from reflected-light information detected by the optical head;
   an amplitude variation signal generator directly connected to the push-pull signal generator and configured to generate and output a fundamental amplitude variation signal indicating the fundamental amplitude variation of the push-pull signal, wherein the amplitude variation signal generator includes:
   a charging circuit for charging a capacitor in response to an increase in amplitude of the input push-pull signal, in a peak holding manner with a predetermined limited rising-up time constant, and
   a discharging circuit for discharging the capacitor such that the changed voltage of the capacitor falls down with a predetermined limited falling-down time constant whereby a signal corresponding to the charged level of the capacitor is output as the fundamental amplitude variation signal;
   an offset signal generator configured to generate an offset signal;
   a reference signal generator connected to the amplitude variation signal generator and to the offset signal generator configured to generate a reference signal by adding the offset signal received from the offset signal generator to the fundamental amplitude variation signal received from the amplitude variation signal generator;
   a pre-pit detector directly connected to the push-pull signal generator and to the reference signal generator and configured to compare the push-pull signal with a reference signal and outputting a comparison result as a pre-pit detection signal; and
   an address decoder for acquiring address information represented by the pre-pits, from the output of the pre-pit detector.

4. A disk drive according to claim 3, wherein
   the disk-shaped storage medium represents, using the pre-pits, address information indicating an address on the disk; and
   the disk drive further comprising an address decoder for acquiring address information represented by the pre-pits, from the output of the pre-pit detector.

5. A disk drive according to claim 3, wherein the fundamental amplitude variation signal is a signal reflecting at least the amplitude variation of the push-pull signal due to wobbling of grooves and due to noise.

6. A disk drive according to claim 3, wherein the amplitude variation signal generator includes
   a charging circuit for charging a capacitor in response to an increase in amplitude of the input push-pull signal, in a peak holding manner with a predetermined time constant; and
   a discharging circuit for discharging the capacitor such that the charged voltage of the capacitor falls down with a predetermined time constant;
   whereby a signal corresponding to the charged level of the capacitor is output as the fundamental amplitude variation signal.

7. A method of detecting pre-pits formed on a disk-shaped storage medium, grooves serving as recording tracks being formed in a wobbling fashion on the disk-shaped storage medium, address information being represented by the pre-pits formed on lands between adjacent grooves, the method comprising the steps of:

generating a push-pull signal from reflected-light information obtained when the disk-shaped storage medium is illuminated with a laser beam, the disk-shaped storage medium representing, using the pre-pits, address information indicating an address on the disk-shaped storage medium;

generating and outputting a fundamental amplitude variation signal, indicating the fundamental amplitude variation of the push-pull signal based directly on the push-pull signal, using a circuit that serves as a peak hold circuit with a limited rising-up time constant in a charging operation and also serves as a discharging circuit with a limited falling-down time constant in a discharging operation;

generating a reference signal by adding an offset signal to the fundamental amplitude variation signal;

comparing the push-pull signal with the reference signal and outputting a comparison result as a pre-pit detection signal; and acquiring address information from the pre-pit detection signal.

8. A pre-pit detection method according to claim 7, wherein the fundamental amplitude variation signal is a signal reflecting at least the amplitude variation of the push-pull signal due to wobbling of grooves and due to noise.

9. A pre-pit detection method according to claim 7, wherein the amplitude variation signal is produced by charging a capacitor in response to an increase in amplitude of the input push-pull signal, in a peak holding manner with a predetermined time constant;

discharging the capacitor such that the charged voltage of the capacitor falls down with a predetermined time constant; and outputting a signal corresponding to the charged level of the capacitor as the amplitude variation signal.

* * * * *